(12) United States Patent
Grohoski et al.

(10) Patent No.: US 7,702,887 B1
(45) Date of Patent: Apr. 20, 2010

(54) PERFORMANCE INSTRUMENTATION IN A FINE GRAIN MULTITHREADED MULTICORE PROCESSOR

(75) Inventors: Gregory F. Grohoski, Austin, TX (US); Paul J. Jordan, Austin, TX (US); Yue Chang, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 593 days.

(21) Appl. No.: 10/881,032

(22) Filed: Jun. 30, 2004

(51) Int. Cl.
*G06F 7/38* (2006.01)
(52) U.S. Cl. .................................. 712/227
(58) Field of Classification Search .................. 712/227
See application file for complete search history.

(56) References Cited

U.S. PATENT DOCUMENTS

| | | | |
|---|---|---|---|
| 3,704,363 A | * | 11/1972 | Salmassy et al. ............. 714/704 |
| 4,969,164 A | * | 11/1990 | Mehta et al. .................. 377/41 |
| 5,046,068 A | | 9/1991 | Kubo et al. |
| 5,257,215 A | | 10/1993 | Poon |
| 5,339,266 A | | 8/1994 | Hinds et al. |
| 5,386,375 A | | 1/1995 | Smith |
| 5,515,308 A | | 5/1996 | Karp et al. |
| 5,546,593 A | | 8/1996 | Kimura et al. |
| 5,619,439 A | | 4/1997 | Yu et al. |
| 5,835,705 A | * | 11/1998 | Larsen et al. ................. 714/47 |
| 5,954,789 A | | 9/1999 | Yu et al. |
| 6,018,759 A | | 1/2000 | Doing et al. |
| 6,052,708 A | | 4/2000 | Flynn et al. |
| 6,076,157 A | | 6/2000 | Borkenhagen et al. |
| 6,088,788 A | | 7/2000 | Borkenhagen et al. |
| 6,088,800 A | | 7/2000 | Jones et al. |
| 6,105,127 A | | 8/2000 | Kimura et al. |
| 6,131,104 A | | 10/2000 | Oberman |
| 6,212,544 B1 | | 4/2001 | Borkenhagen et al. |
| 6,282,554 B1 | | 8/2001 | Abdallah et al. |
| 6,341,347 B1 | | 1/2002 | Joy et al. |
| 6,349,319 B1 | | 2/2002 | Shankar et al. |
| 6,357,016 B1 | | 3/2002 | Rodgers et al. |
| 6,397,239 B2 | | 5/2002 | Oberman et al. |
| 6,415,308 B1 | | 7/2002 | Dhablania et al. |

(Continued)

OTHER PUBLICATIONS

Tulsen et al., "Power-sensitive multithreaded architecture," IEEE 2000, pp. 199-206.

(Continued)

*Primary Examiner*—Eddie P Chan
*Assistant Examiner*—John Lindlof
(74) *Attorney, Agent, or Firm*—Rory D. Rankin; Meyertons Hood Kivlin Kowert & Goetzel, P.C.

(57) ABSTRACT

A method and mechanism for monitoring events in a processing system. A performance monitoring mechanism includes is configured to store a count of events in an event counter. Periodically, the count stored in the event counter is updated to a new count. If the new count equals a predetermined value, an indication that the count equals the predetermined value is conveyed. If the new count does not equal the predetermined value, but is within a given epsilon of the predetermined value and the occurrence of a corresponding event is detected, an indication that the count equals the predetermined value is conveyed. The mechanism is further configured to suppress event counts which correspond to mis-speculations.

19 Claims, 9 Drawing Sheets

U.S. PATENT DOCUMENTS

| | | |
|---|---|---|
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

| Execution cycle | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |

FIG. 3

PERFORMANCE INSTRUMENTATION IN A FINE GRAIN MULTITHREADED MULTICORE PROCESSOR

BACKGROUND OF THE INVENTION

1. Field of the Invention

The invention relates to computing systems and, more particularly, to the management of operating system instances and services.

2. Description of the Related Art

Modern processors typically include performance monitoring logic (PML) to measure processor performance while running application code and to help identify performance bottlenecks. Two features commonly found in PML are (1) the ability to count certain processor events, such as cache misses, branch mispredictions, etc., and (2) the ability to cause a trap when a counter reaches a particular value (such as overflowing from all one's to zero). Diagnostic software typically configures these counters to measure processor performance over particular intervals. For example, one simple measurement may be a count of the number of instructions executed. By also counting the number of cycles over which a given number of instructions were executed, the instructions per cycle (IPC) over an interval can be derived. If the performance over a given interval drops unexpectedly, then the given interval is selected for more detailed analysis. By configuring performance monitor counters to measure other events during a rerun of the given interval, the reason for the low performance may be identified.

For example, if the IPC is found to be too low, the counters may be configured to count branch mispredictions, cache misses, or TLB misses which commonly result in low IPC. If the number of cache misses is suspiciously high, then that may point towards the cause of the reduced performance. In this manner diagnostic software can narrow the possible causes of performance issues. Once a primary cause has been identified, more in-depth analysis can be performed.

Consider the case of an unexpectedly high data cache miss rate. The next step is generally to find which processes, programs, subroutines or functions, and program statements are responsible for the majority of the cache misses. In order to further isolate the cause, periodic sampling may be used. To perform such sampling, software configures a counter to count data cache misses and a trapping mechanism to "trap" (e.g., generate a software exception) when the counter overflows. Software then sets the counter to a predetermined value based upon how frequently it wants the counter to overflow, and thus the "sample" to be taken. For example, if loads and stores comprise 30% of the dynamically executed instructions on average, and software wants to sample every 10,000 instructions, then the counter would be programmed with −3000. When the 3000th data cache miss occurs, hardware would direct a trap to a software trap handler, which would then capture the PC (program counter) of the instruction which caused the counter to wrap. Software can record the PC, reload the counter with −3000, and return to the running program. Diagnostic software can then identify which program statement was executing when the counter wrapped (e.g., caused the 3000th data cache miss). By choosing an appropriate sample interval, software can build a "miss profile" which isolates the performance issue. For example, it may be that a load of a particular array element in a loop is responsible for most of the accesses. Then the program may be recoded such that the access pattern is different, or the data is prefetched, for example by judiciously inserting data prefetch instructions.

In this mode of operation, then, there are two important properties. First, the instruction which was executing when the trap was taken be should be as closely related as possible to the instruction which caused the performance event which caused the counter to wrap (ideally it would be the same instruction). The further away the instruction which was executing when the trap occurred from the event-causing instruction, the more difficult it is to associate a program statement with a performance problem. Second, event counting should be reasonably accurate (ideally it would be perfectly accurate). In other words, if N cache misses occurred, the counter would register N. In particular, the counter should not be "polluted" by events which did not occur, nor should it overcount or undercount events which did occur. Both properties involve trade-offs between implementation difficulty and chip area and power and it is difficult to build PML which satisfies both of the properties, uses a small amount of area, is simple to implement, and is simple to verify.

Accordingly, an effective method and mechanism for performance monitoring is desired.

SUMMARY OF THE INVENTION

A performance instrumentation mechanism is contemplated in which an indication that a particular event has occurred may be conveyed when in fact the event may not have occurred. In one embodiment, a counter is utilized to record the detection of events. The counter is initialized to a negative value and incremented in response to detecting a event which is being monitored. In response to detecting the counter has wrapped, an indication may be conveyed that the counter has wrapped. In addition, if the detection of an event increments the counter to a value which is within a particular range, or epsilon, of wrapping, an indication is conveyed that the counter has wrapped. In this manner, the instruction type which traps will be one of the types of instructions which can cause the performance event, as opposed to some unrelated instruction.

In one embodiment, a performance monitor unit includes an event counting mechanism which includes a configuration register and a count register. By writing appropriate values to the configuration register, and initializing the count register to an appropriate value, particular events may be monitored and counted. In one embodiment the count register includes two separate halves, each of which may be utilized to store the count for a different event.

Also contemplated is a performance monitor unit configured to support event monitoring for a multithreaded processing system. In such an embodiment, an event counting mechanism is included for each of eight threads of instructions. In one embodiment, the performance monitor unit is configured to cycle through and select each of the eight counting mechanisms in turn. Accordingly there may be a particular latency between selections of a given counting mechanism. Upon selecting a particular counting mechanism, the corresponding event counter is updated and if the counter has wrapped, or is within an epsilon of wrapping, a signal may be conveyed which indicates the counter has wrapped. In one embodiment, a relatively small register may be utilized to store the count of events for a given counting mechanism during the selection latency period.

Also contemplated is a performance monitor unit which may suppress event counts for speculative events. For example, event counts corresponding to instructions which enter an execution pipeline as the result of a mispredicted branch may be suppressed.

These and other embodiments, variations, and modifications will become apparent upon consideration of the following description and associated drawings.

BRIEF DESCRIPTION OF THE DRAWINGS

FIG. 3 illustrates one embodiment of a pipeline.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Overview of Multithreaded Processor Architecture

Figure 1:
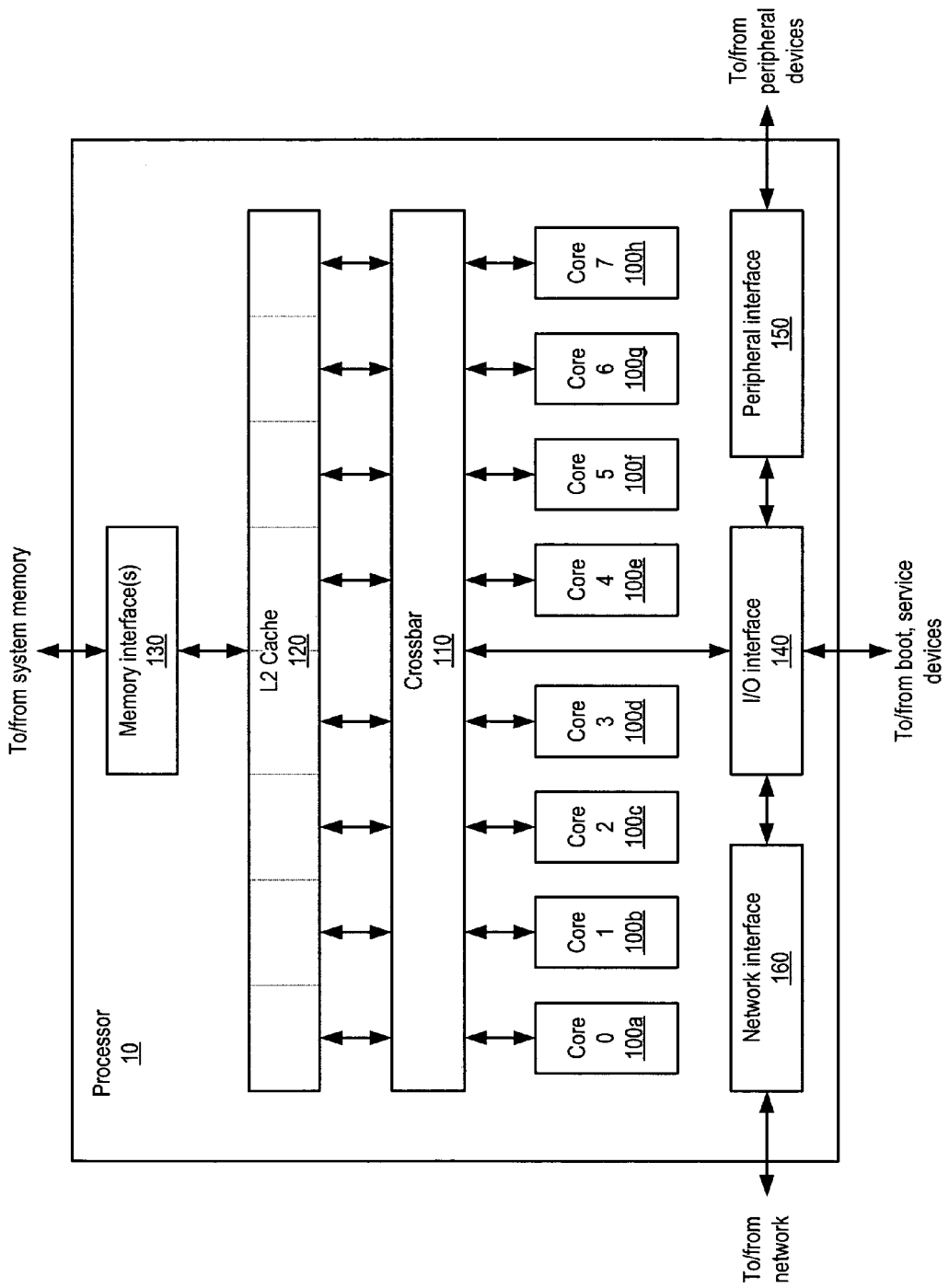
FIG. 1 is a block diagram illustrating one embodiment of a multi-threaded multi-core processor.

A block diagram illustrating one embodiment of a multithreaded processor 10 is shown in FIG. 1. In the illustrated embodiment, processor 10 includes a plurality of processor cores 100*a-h*, which are also designated "core 0" though "core 7".

Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
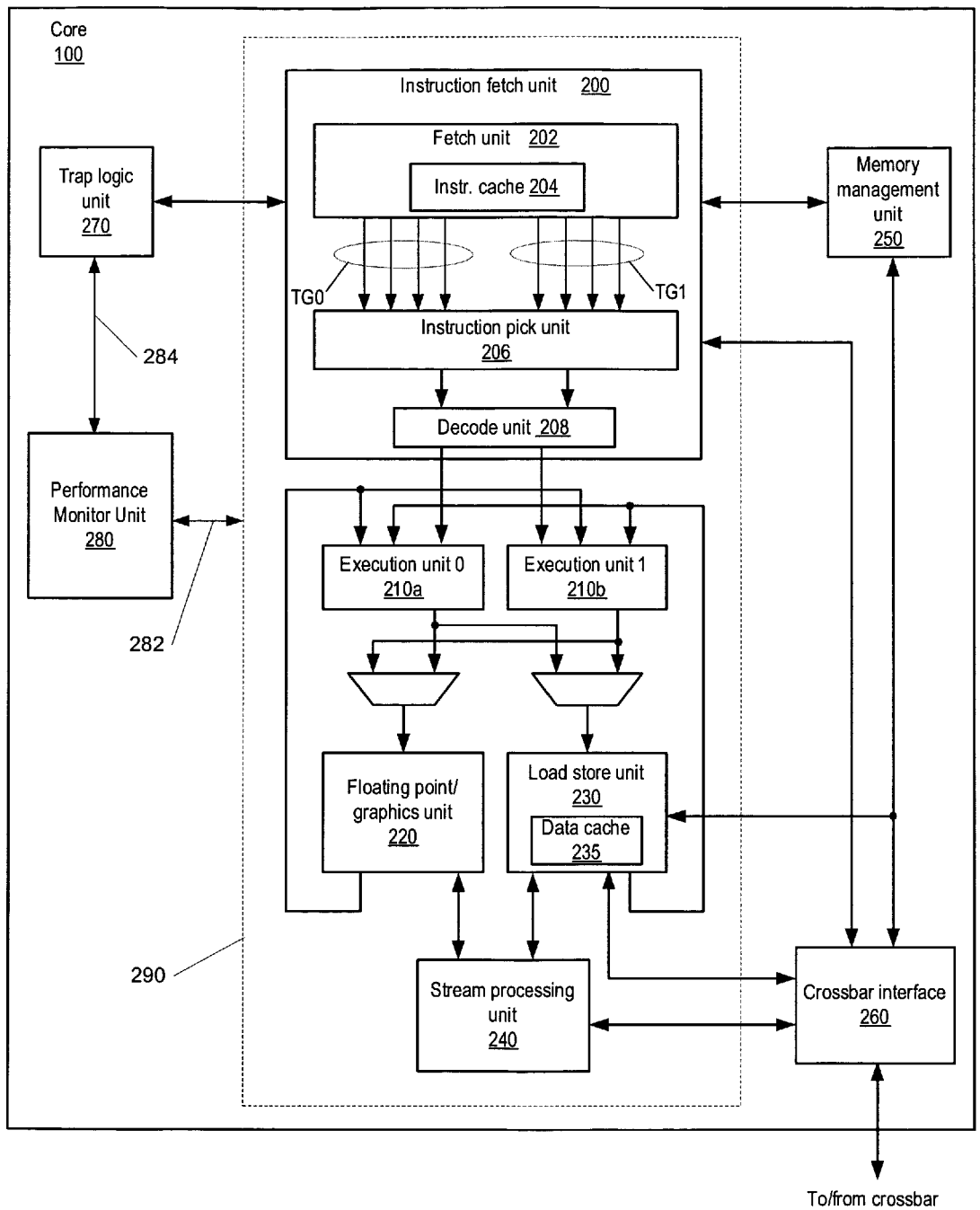
FIG. 2 is a block diagram illustrating one embodiment of a core depicted in FIG. 1.

FIG. 2 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, a performance monitor unit (PMU) 280, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1. PMU 280 is coupled to TLU 270 and is further coupled to one or more of the units encompassed within block 290.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 215 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Figure 4:
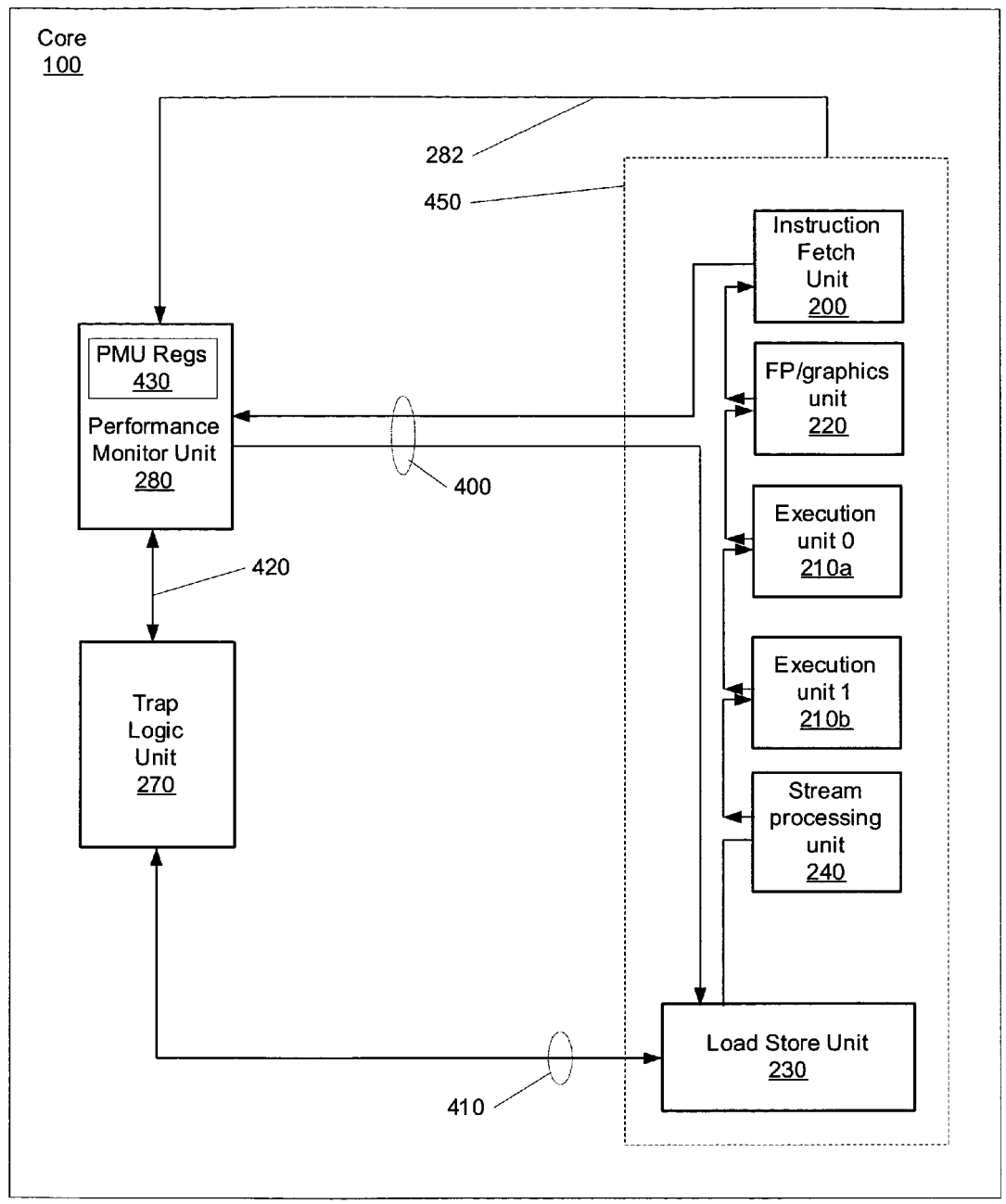
FIG. 4 is a block diagram illustrating one embodiment of configuration and status bus coupled to units in a core.

FIG. 4 depicts one embodiment wherein performance monitor unit (PMU) 280 includes both configuration and status registers 430. In the embodiment shown, access to registers 430 is accomplished via special bus 400. In one embodiment, bus 400 may be configured as a ring coupled to each of unit 200, 210, 220, 230, 240, and 280, as shown. In such an embodiment, register accesses via bus 400 may be initiated by load store unit (LSU) 230. However, other bus configurations are possible and are contemplated. LSU 230 is also shown to be coupled to trap logic unit (TLU) 270 via bus 410. As trap processing may require relatively prompt action, bus 410 coupled between TLU 270 and LSU 230 may provide for reduced latency as compared to bus 400. FIG. 4 also shows PMU 280 is coupled to receive data from, or send data to, one or more of the units depicted within block 450. In addition, PMU 280 is coupled to communicate with TLU 270 via bus 420.

In one embodiment, PMU 280 includes a configuration register and a count register for each of eight threads supported by core 100. Each configuration register may generally be utilized to identify what types of events are to be monitored for the corresponding thread. Each corresponding count register may then be configured to maintain a count for the identified event(s).

Figure 5:
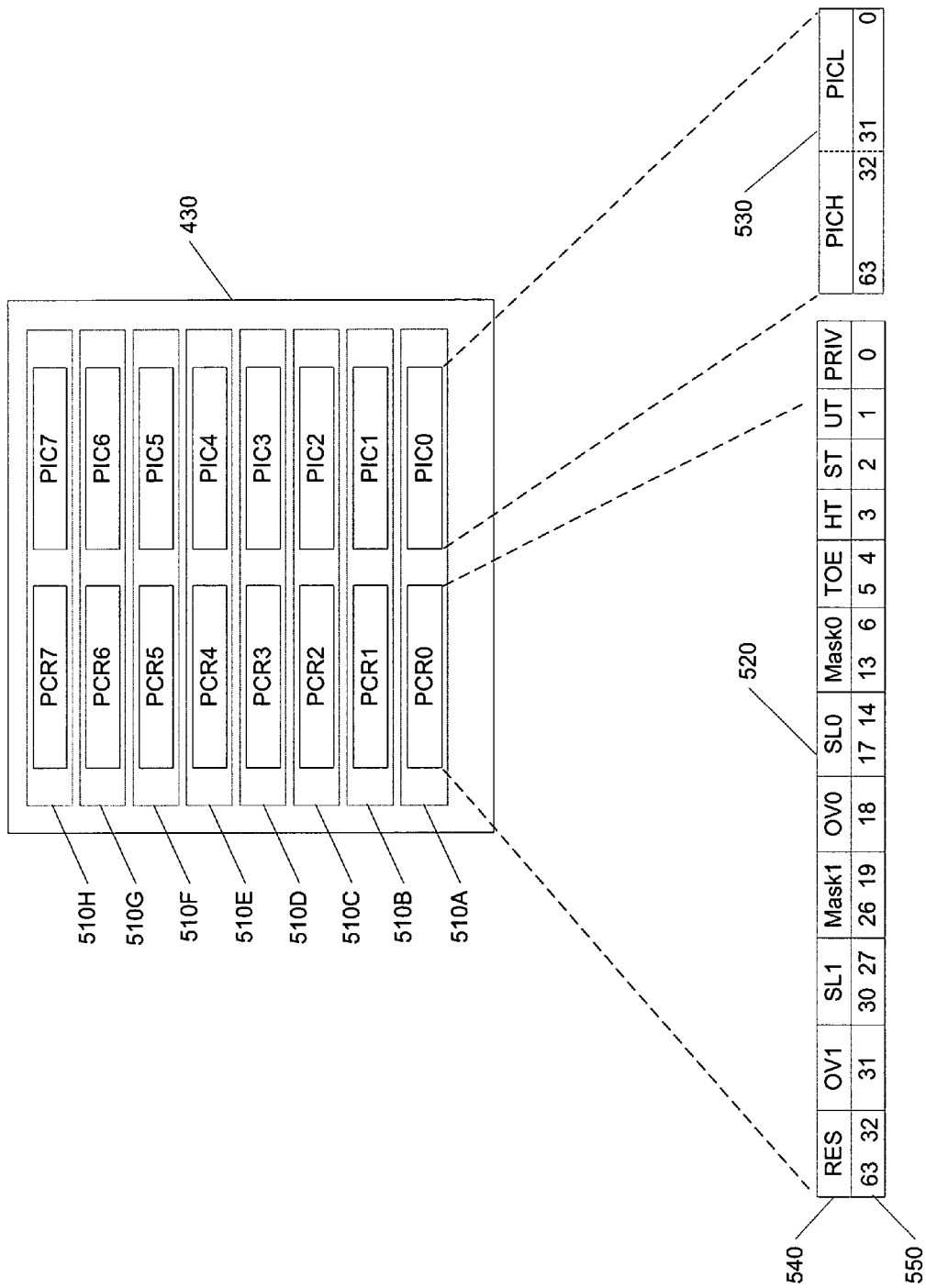
FIG. 5 depicts one embodiment of performance monitor registers.

Turning now to FIG. 5, one embodiment of PMU registers 430 is shown. Eight pairs of registers 510A-510H are depicted in FIG. 5. Each pair of registers corresponds to a particular thread supported by the core 100. Included in each pair of registers is a Performance Control Register (PCR) and a Performance Instrumentation Counter (PIC) register. Also illustrated in FIG. 5 is an enlarged view of one of the PCR registers (PCR0 520) and one of the PIC registers (PIC0 530). In the embodiment shown, each of PCR0 and PIC0 include 64 bits of data. For each of the depicted registers 520 and 530, a first row identifies a field 540 and the second row identifies bit positions which correspond to the corresponding field. PIC registers may generally be divided into two 32 bit halves. As shown in FIG. 5, register PIC0 530 include both a high portion (PICH) and a low portion (PICL). In this manner, two 32 bit counts may be maintained for the corresponding thread. Table 1 below provides a description of the fields for one embodiment of a PCR.

TABLE 1

| Bit Positions | Field | Definition |
| --- | --- | --- |
| 63:32 | RES | Reserved |
| 31 | OV1 | Set to one when corresponding PIC high (PICH) wraps to 0; reset to 0 when corresponding PCR is read |
| 30:27 | SL1 | Selects up to 1 of 16 classes of events for PIC high |
| 26:19 | Mask1 | Event mask for PICH |
| 18 | OV0 | Set to one when corresponding PIC low (PICL) wraps to 0; reset to 0 when corresponding PCR is read |
| 17:14 | SL0 | Selects up to 1 of 16 event types for PICL |
| 13:6 | Mask0 | Event Mask for PICL |
| 5:4 | TOE | Trap-on-Event. TOE[0] corresponds to OV0; TOE[1] corresponds to OV1. Hardware will AND TOE[i] and OV[i] to produce a trap. |
| 3 | HT | If 1, count events when in hypervisor mode. |
| 2 | ST | If 1, count events when in supervisor mode. |
| 1 | UT | If 1, count events when in user mode. |
| 0 | PRIV | If 1, then cause a privileged_action trap if user code attempts to read or write to the corresponding PLC register. |

In the embodiment described by Table 1, the SL and Mask fields are used to determine what events are to be monitored and counted. For example, the SL0 and Mask0 field of a particular PCR register may be used to configure the PMU 280 to monitor and count a first type of event for a first thread. In addition, SL1 and Mask1 may be used to monitor and count a second type of event for the same thread. PICH is used to store the count for events identified by SL1 and Mask1, and PICL is used to store the count for events identified by SL0 and Mask0. Consequently, the PIC register for a given thread may include two counters (PICH and PICL) which are both configurable via the corresponding PCR. The OV bit may be utilized as a software aid. For example, the OV bit may be used by software to determine which counter(s) has (have) wrapped. Once an OV bit is set, it can be reset by writing to the entire register, or by reading the register. Software may also cause an overflow trap by writing a 1 into any OV field and setting the corresponding TOE bit. Each of the HT, ST, and UT bits may be utilized to indicate privilege levels. For example, if the HT bit is set, events may be counted only when operating in hypervisor mode. Similarly, the ST bit may indicate events are counted only if executing in supervisor mode, and the UT bits may indicate events are counted only if operating in user mode. Generally speaking, PCR and PIC registers may be privileged. In such an embodiment, the PRIV bit may be utilized to cause a trap if user code attempts an access to a PIC register.

As noted above, each of the SL fields (SL0 and SL1) include 4 bits. Therefore, the SL field may identify one of sixteen classes, or categories, of events. The classes of events identified may include events which are somehow related to one another (completed branches and taken branches are both "branch" related). Alternatively, classes of events may include any arbitrary grouping of events desired. Each of the Mask fields in the embodiment shown (Mask0 and Mask1) include 8 bits. In one embodiment, each of the eight bits of a Mask corresponds to an event within the class of events identified by the corresponding SL field. In this manner, the Mask field may identify a sub-class of events within a class of events identified by the SL field. For example, Table 2 below depicts possible encodings for SL and Mask fields. It is noted that numerous other encodings are possible and are contemplated. Table 2 is merely offered to illustrate how the SL and Mask fields may be utilized.

TABLE 2

| SL[3:0] Value | Mask[7:0] |
| --- | --- |
| 0 | — |
| 1 | — |
| 2 | 0x01 Completed Branches |
|   | 0x02 Taken Branches |
|   | 0x04 FGU Arithmetic Instructions |
|   | 0x08 Load Instructions |
|   | 0x10 Store Instructions |
|   | 0x20 sethi % hi(0xfc000),% g0 |
|   | 0x40 Atomics |
|   | 0x80 Other Instructions |
| 3 | 0x01 I-Cache Misses |
|   | 0x02 D-Cache Misses |
|   | 0x04 ITLB Misses |
|   | 0x08 L2 Cache Instruction Misses |
|   | 0x10 L2 Cache Load Misses |
|   | 0x20 L2 Cache Store Misses |
|   | 0x40 Other Event 1 |
|   | 0x80 Other Event2 |
| 4-15 | Other event encodings |

In the exemplary encodings depicted in Table 2, two classes of events are illustrated. The first class of events shown corresponds to an SL value of 2 ($0010_2$) and the second class of events corresponds to an SL value of 3 ($0011_2$). Within each of the illustrated classes, eight mask encodings are depicted. While the mask encodings shown in Table 2 all illustrate encodings with only a single bit set, other encodings may include setting more than a single bit. To that extent, the Mask encodings illustrated serve to identify which bit(s) of the Mask are to be set in order to monitor the corresponding event. Utilizing the encodings depicted in Table 2, completed branches may be monitored by setting the SL register="0010" and the Mask="00000001". Alternatively, both completed branches and Load instructions may be monitored by setting the SL register="0010" and the Mask="00001001". Numerous alternative encodings are possible and are contemplated.

Figure 6:
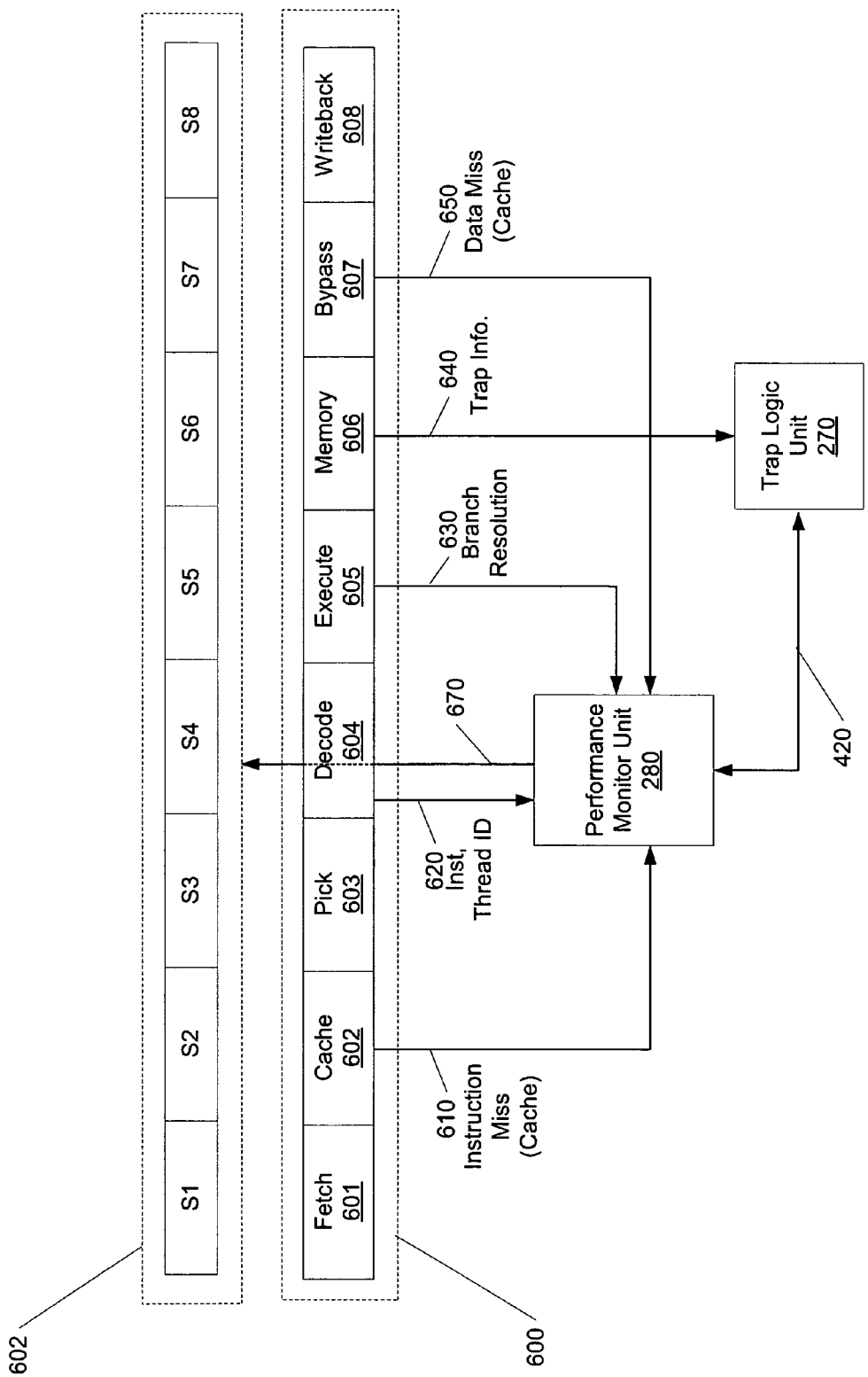
FIG. 6 depicts illustrates one embodiment of a pipeline, performance monitor unit, and trap logic unit.

Turning to FIG. 6, one embodiment of how PMU 280 may operate in relation to an execution pipeline within core 100 is shown. FIG. 6 depicts a pipeline 600 which generally corresponds to the pipeline described in relation to FIG. 3. Included in the pipeline 600 is an Fetch stage 601, Cache stage 602, Pick stage 603, Decode stage 604, Execute stage 605, Memory stage 606, Bypass stage 607, and Writeback stage 608. Also illustrated is a pipeline 602 of stored data with stages S1-S8 which correspond to each of the stages 601-608 in pipeline 600. Data stored within pipeline 602 may generally identifying information for an instruction in the corresponding pipeline 600 stage. Such identifying information may include an identification of the instruction, a thread ID, any exception or trap information, and so on. Generally speaking, the associated information within pipeline 602 travels along the pipeline with the corresponding instruction. It is noted that while pipeline 602 is depicted as being separate from pipeline 600 (for ease of illustration), they may in fact be considered part of the same pipeline.

As may be seen from FIG. 6, PMU 280 is coupled to TLU 270 via bus 420. In addition, PMU 280 is shown to receive information from various stages of pipeline 600. For example, Cache stage 602 is coupled to provide an instruction (cache) miss indication 610 to PMU 280 via bus 610. Decode state 604 is coupled to provide instruction and thread ID information 620 to PMU 280 via bus 620. Execute stage 605 provides a branch resolution indication 630 to PMU 280, and Bypass stage 607 provides a data (cache) miss indication 650 to PMU 280. In addition, Memory stage 606 may provide trap related information to Trap Logic Unit 270 via bus 640. Finally, PMU 280 is coupled to TLU 270 via bus 420.

Generally speaking, PMU 280 may be configured to store information in pipeline 602 corresponding to event, or other, information detected during an instruction's traversal of pipeline 600. For example, if during Cache stage 602 an I-Cache miss is detected, a corresponding indication 610 may be conveyed to PMU 280 via signal(s) 610. If the PMU 280 is currently configured to monitor such events (i.e., I-Cache misses) for the thread which corresponds to the instruction which missed in the I-Cache, then PMU unit 280 may store an indication within pipeline 602 stage S2 which identifies the event, the instruction, the thread ID, and any other information desired. Similarly, upon decode of a particular instruction, Decode stage 604 may convey instruction and thread ID information to PMU 280 via bus 620.

As mispredicted branches may result in the entry of a spurious stream of instructions into pipeline 600, counts being maintained by the PMU 280 may be "polluted" by counting events which should not be counted. In order to avoid pollution of the performance monitor counts, branch resolution information conveyed via bus 630 may be used to suppress performance monitor counts and related information from the PMU unit 280. Suppressing performance monitor counts may simply entail preventing a particular counter from being incremented. In such an embodiment, incrementation of the performance monitor count must generally be delayed until the outcome of the branch is resolved. Alternatively, a mechanism to rewind and "reduce" counts may be included. Consequently, instructions which are flushed from the pipeline 600 (e.g., due to a mispredicted branch) do not pollute the performance monitor counters.

Figure 7:
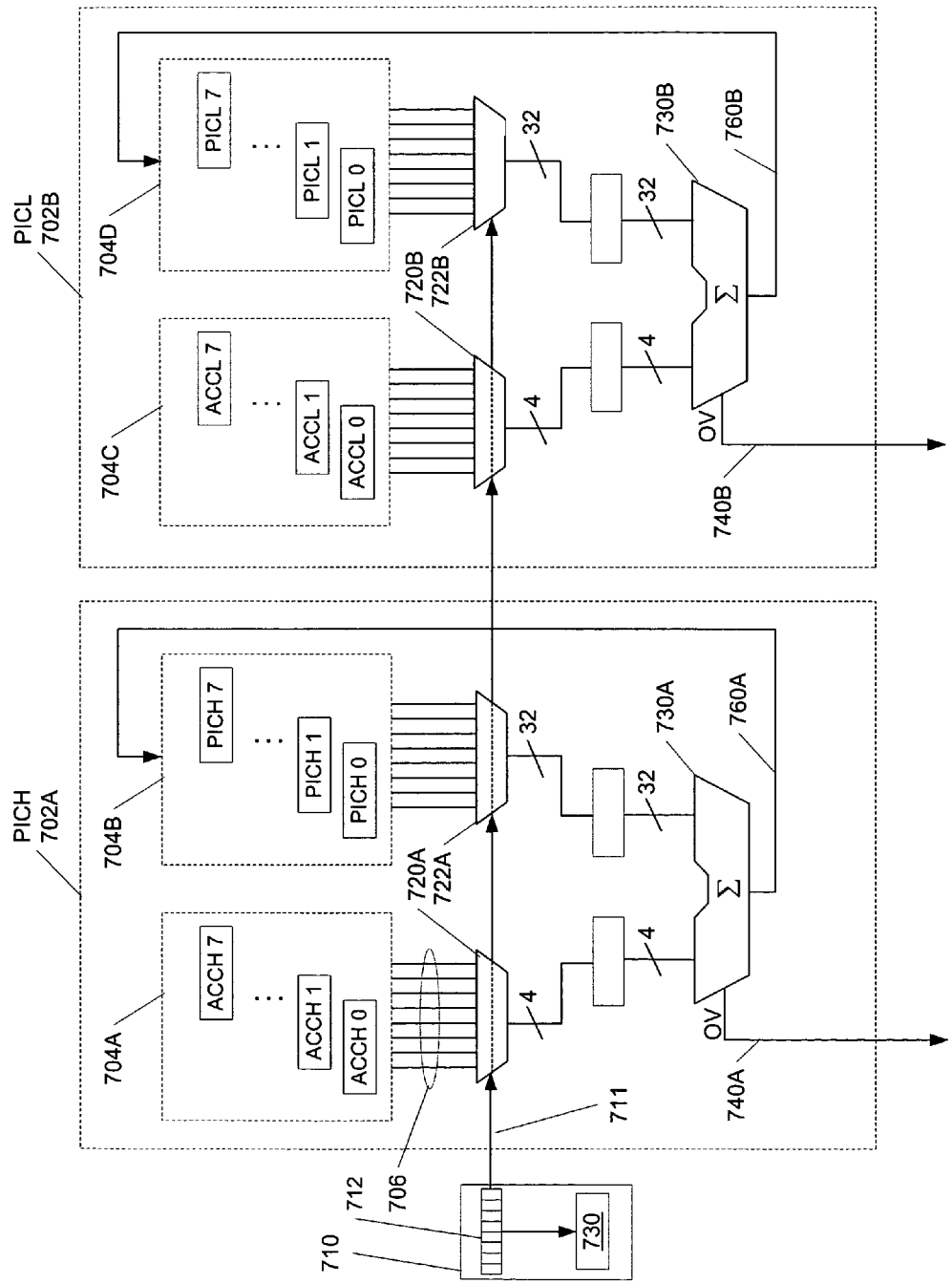
FIG. 7 illustrates one embodiment of a performance instrumentation mechanism.

FIG. 7 illustrates one embodiment of a performance instrumentation mechanism within PMU 280. Generally speaking, FIG. 7 depicts counter mechanisms which correspond to the PIC registers discussed above. As described above, each PIC register may be configured to maintain two counts/counters for a given thread. In the example of FIG. 7, a first counter mechanism PICH 702A corresponding to a "high" portion of each PIC register is shown and a second counter mechanism PICL 702B corresponding to a "low" portion of each PIC register is shown. Eight PICH registers 704B (PICH0-PICH7) and eight PICL registers 704D (PICL0-PICL7) are shown. In addition, each PICH and PICL register has an associated accumulator (ACC) register which is configured to store a temporary count of events detected. For example, PICH0 has an associated ACCH0 register, PICL3 has an associated ACCL3 register and so on. In the example of FIG. 7, eight ACCH registers 704A (ACCH0-ACCH7) are shown and eight ACCL registers 704C (ACCL0-ACCL7) are shown.

In the embodiment shown, each ACCH register 704A is coupled to a multiplexor 720A via a separate bus 706. Similarly, each PICH register 704B is coupled to a multiplexor 722A via a separate bus, each ACCL register 704C is coupled to a multiplexor 720B via a separate bus, and each PICL register 704D is coupled to a multiplexor 722B via a separate bus. Generally speaking, each multiplexor (720, 722) is configured to convey the contents of one of the eight coupled registers at a time. In one embodiment, each ACC register (ACCH and ACCL) comprises 4 bits and each PIC register (PICH and PICL) comprises 32 bits. Each of the values conveyed by the corresponding multiplexor (720, 722) may then be latched and summed (730A, 730B). In the event of an overflow from the addition, an overflow signal OV (740A, 740B) may be conveyed. In one embodiment, the overflow signals OV 740 are wired to update fields OV1 and OV0 of a corresponding PCR register 520. For example, if an overflow corresponding to register PICH0 is detected, signal OV1 740A is asserted and the OV1 field of register PCR0 is set. In this manner, if an overflow due to the addition 740A occurs, then one of the eight PCR0 to PCR7 OV1 fields are set to '1'. The particular PCR register to be updated may be identified by the thread ID 730 whose operation is discussed below. Similarly, if an overflow due to addition 740B occurs, a corresponding one of the eight PCR0 to PCR7 OV0 fields are set to '1'.

In one embodiment, each PIC register count is conveyed and updated on a periodic basis. For example, on a first cycle, the PICH0 and PICL0 register counts may be conveyed from multiplexors 722A and 722B, then on a second cycle the PICH1 and PICL1 register counts may be conveyed from multiplexors 722A and 722B. Concurrent with the conveyance of a particular register count, the contents of the corresponding ACC register are also conveyed. Therefore, on the cycle in which the PICH0 register count is conveyed, the contents of the ACCH0 register are also conveyed. FIG. 7 illustrates a selection mechanism 710 which is configured to control which values are conveyed from multiplexors 720 and 722 using signal 711. In an embodiment wherein each multiplexor (720, 722) is configured to convey one of eight values, signal 711 may comprise 3 bits. As the value conveyed by mechanism 710 via signal 711 selects one of eight sets of registers at a time (PIC0-PIC7), the value conveyed by mechanism 710 may also be seen as corresponding to a particular thread. Therefore, a value of "000" may be conveyed via signal 711 in order to select and convey thread 0's PIC register values (PICH0 and PICL), and so on.

In an alternative embodiment, signal 711 may comprise eight bits—one of which is set in a given period for selecting a thread. In one embodiment, mechanism 710 may comprise rotating bits in a register 712 which are used by multiplexors 720 and 722 to select on of eight values for conveyance. Each cycle, a set bit rotates within register 712 to indicate which of the eight threads are selected. In either embodiment, the value of signal 711 which is conveyed, and a latch 730, may represent the currently selected thread ID.

In one embodiment, the value within a given PIC register (PICH and PICL) is added to its corresponding ACC register during each period in which the registers are selected by mechanism 710. If the sum of the register values equals a predetermined value, a trap signal may be generated and conveyed. For example, in one scenario a trap is to be taken upon detecting 3000 I-Cache misses for a thread with thread ID=2. Therefore, PCR2 may be configured such that PIC2H keeps a count of I-Cache misses. PIC2H may then be initialized to the value −3000. Accordingly, for the embodiment shown where each PICH register includes 32 bits, the PIC2H register may be initialized to 0xFFFFF448. In this manner, the addition of 3000 (0xBB8) to the initial value (0xFFFFF448) will cause the register to wrap to zero which may be easily detected. In this embodiment, ACC2H then is configured to keep a count of I-Cache misses which are then periodically added to the count stored in the corresponding PIC2H register.

As the illustrated embodiment is only configured to check event counts for a given thread on a periodic basis, and the number of events which may be detected within a corresponding period may be known, the size of the ACC registers may be chosen accordingly. For example, in one embodiment up to 2 events per cycle per thread may be detected. In addition, the counts for a given thread may be checked and updated once every eight cycles. Accordingly, up to 16 events may be detected between the time a thread's counts were last updated. Therefore, each ACC register may register no more than 16 events during the given period and 4 bits is sufficient to account for this maximum number of events. Of course, other embodiments may be configured to detect more than 16 events during a given period and the ACC registers may be chosen to be larger.

Subsequent to adding the detected event count within an ACC register to a corresponding PIC register count, the sum 760 of the values is conveyed back to the same PIC register where it is latched. In this manner the PIC register maintains a cumulative count of events detected over time. Subsequent to adding the ACC count value to the corresponding PIC count value, the ACC register may be cleared.

Figure 8:
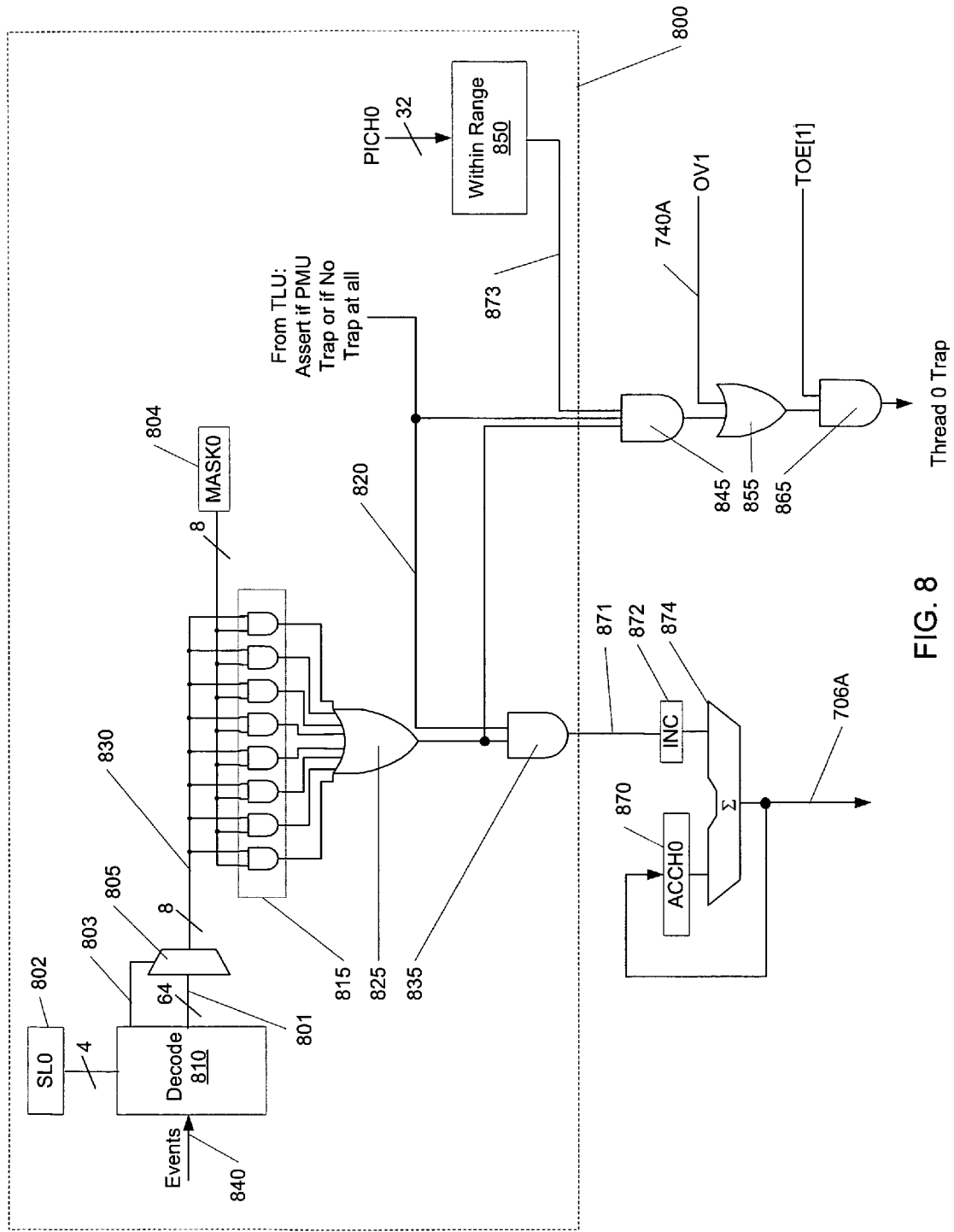
FIG. 8 depicts one embodiment of event counting logic corresponding to the instrumentation depicted in FIG. 7.

Turning now to FIG. 8, one embodiment of logic associated with one of accumulator and PIC registers 704A-704D is shown. In general, logic similar to that depicted in FIG. 8 is associated with each of the accumulator and PIC registers 704. In the example shown, PCR register fields SL0 802 and Mask0 804 are shown. Also shown is an accumulator register ACCH0 870. Generally speaking, the circuitry and logic depicted by block 800 is configured to convey a signal 871 which indicates whether an event to be counted has been detected. In response to signal 871 being asserted, logic 872 conveys a value of "1" to summation logic 874 which adds the received value of "1" to the current value of the ACCH0 register 870. In this manner the value of the ACCH0 register 870 is incremented. Likewise, the sum of the ACCH0 register 870 and the value conveyed by logic 872 are conveyed via bus 706A.

As described in Table 1, the SL0 field 802 may include 4 bits capable of identifying one of 16 classes of events. In addition, Mask0 804 includes eight bits and may identify a subclass of events. In one embodiment, the SL0 field 802 may be used to identify only 8 classes of events. For example, SL0 values of 0-7 may be actively used for identifying classes of events, while SL0 values of 8-15 may be reserved for other purposes. Of course numerous such alternatives are possible and are contemplated.

In the embodiment shown, Decode logic 810 is configured to receive the 4 bits of the SL0 field 802. In addition, also conveyed to decode logic 810 is an indication 840 identifying a detected event. Decode logic 810 is coupled to a multiplexor via a 64 bit bus 801. In one embodiment, the 64 bits of the bus 801 represents 8 bits for each of 8 classes of events. SL0 bits 802 may then be decoded to provide a signal 803 for conveying a particular group of 8 bits from the multiplexor 805. Generally speaking, the group of bits selected for conveyance from the multiplexor 805 corresponds to a class of events which is being monitored. In one embodiment, only 8 classes of events are actively monitored. Accordingly, fewer than all 4 bits of the SL0 field 802 may be required.

In response to receiving an event indication 840, Decode logic 810 asserts the bit(s) of bus 801 which correspond to the detected event. If the SL0 field 802 is configured to monitor a class of events which corresponds to the detected event, the 8 bits corresponding to the class of the detected event will be selected for conveyance from the multiplexor 805 via bus 830. On the other hand, if the SL0 field is not currently configured to monitor classes of events which includes the detected event, bits corresponding to the detected event will not be selected for conveyance from the multiplexor 805.

Each bit of bus 830 is coupled to one of 8 logic AND gates 815. In addition, each of the AND gates 815 is also coupled to receive as input one of 8 bits of the Mask0 804. Consequently, if one or more bits of the Mask0 804 are currently set, and a corresponding bit of bus 830 is also asserted, the output from the corresponding AND gate will likewise be asserted to indicate detection of a monitored event. Still further, the assertion of any of the inputs of logic OR gate 825 will results in the output from OR gate 825 being asserted. Generally speaking, the output from logic OR gate 825 may indicate an event which corresponds to a monitored class of events has been detected.

However, as not all events are to be counted, an additional signal 820 may be utilized to qualify detected events. In the embodiment shown, the TLU 270 may convey a signal which indicates whether a trap corresponds to a PMU 280 trap or otherwise. If the TLU 270 is indicating a trap, then any currently detected event conveyed from OR gate 825 should not be counted unless the trap is the result of PMU 280 activity. For example, upon a mispredicted branch, the TLU 270 may take a trap. In such a case, instructions along the mispredicted branch path may be flushed from the pipeline. In order to avoid polluting the performance monitor counts, events corresponding to the flushed instructions should not generally be counted. Accordingly, the output from OR gate 825 may feed logic AND gate 835 along with signal 820. If no trap is detected, signal 820 is asserted. In addition, a PMU related trap will cause assertion of signal 820. Signal 820 is negated in the event of a non-PMU trap. In this manner, the signal conveyed from OR gate 825 may be additionally qualified by signal 820, with the resulting signal being signal 871.

In an embodiment where 8 of 16 identifiable events encodings of the SL0 field 802 are reserved, the 4 bits of the SL0 field 802 may be decoded to 8 bits, each of which corresponds to one of the 8 remaining classes of events which may be monitored. Each of the 8 bits conveyed via bus 801 to an 8:1 multiplexor may then correspond to a single class of events. In addition, decode logic 810 may also determine to which of the 8 classes of events a detected event 840 corresponds. Based upon this determination, a select signal 803 may be asserted which selects the corresponding class of events from bus 801. If select signal 803 (corresponding to a detected event) selects for conveyance from multiplexor 805 a bit which corresponds to an event being monitored (as indicated by SL0 field 802), then the signal 830 will be asserted. Those skilled in the art will appreciate there are numerous alternative ways of decoding, masking, and combining the signals depicted in FIG. 8. All such alternatives are contemplated.

FIG. 8 also depicts a comparator 850 coupled to receive the value of a given PICH or PICL register (PICH0 or PICL0). Comparator 850 is further configured to convey a signal 873 to logic AND gate 845. Generally speaking, the comparator 850 is configured to determine whether the received value of a PICH or PICL register is within a given range, or epsilon, of a predetermined value (e.g., 0). If the value of the PIC register is within the given range of the predetermined value, then signal 873 is asserted. Further, if a performance event occurs which does not correspond to a flushed instruction as described above, then AND gate 845 generates a signal to logic OR gate 855 which signals that the respective PICH or PICL register may overflow. This signal 873 thus identifies an instruction which should be counted and potentially trapped on. Logic OR gate 855 is further coupled to receive as input the current value of the overflow field OV for the corresponding PCR register. In the example show, OR gate 855 receives as input OV1 signal 740A which was described in FIG. 7. Consequently, the output of OR gate 855 will be set if either the OV1 signal 740A is set or the output of logic AND gate 845 is asserted. In one embodiment, the output of logic OR gate 855 may be further qualified by a corresponding TOE field as described in Table 1. In the example of FIG. 8, the output of logic OR gate 855 is fed to logic AND gate 865 which also receives as input the TOE[1] bit for the corresponding PCR register (PCR0 in this example). Therefore, when asserted, the output of logic AND gate 865 signals a trap for the corresponding thread. It is noted that AND gate 835 in this case will allow the accumulator 870 to be incremented, properly recording the fact that an event occurred. The addition of the accumulated value 706A to the PIC register in 730A-B will thus correctly result in the PICH or PICL register being properly updated to reflect the correct number of performance events which occurred.

In one embodiment, comparison logic 850 determines whether the received value is within a fixed count (e.g., 15) of zero. For example, in the scenario described above, each PIC register (PICH and PICL) includes 32 bits. If 3000 I-Cache misses are to be detected, a given register PIC2H may be initialized to the value 0xFFFFF448 (i.e., $-3000_{10}$ in this example). Each time the PIC2H is selected by mechanism 710 for updating, the count stored in corresponding ACC2H is added to the value stored in PIC2H. Then comparison logic 850 may determine whether the value stored in PIC2H is any value within 15 of zero. For example, comparison logic 850 may detect whether the PIC2H count equals any of values $-15, -14, -13, \ldots -2$, or $-1$. Therefore, if the value received by comparison logic 850 is anywhere between 0xFFFFFFEB and 0xFFFFFFFF, comparison logic 850 will convey an indication that the trapping event (i.e., detection of 3000 I-Cache misses) has occurred. It is noted that the range which comparison logic 850 checks may be either hardwired or configurable (e.g., via a configuration register).

While it is possible that the comparison logic 850 may convey an indication that a particular event occurred prior to its actual occurrence (e.g., an indication that 3000 I-Cache misses have occurred when only 2991 have actually occurred), the mechanism ensures that the instruction causing the event which resulted in the I-Cache miss indication is in fact a type of instruction which is being monitored for causation of I-Cache misses. In this manner, the instruction identified by the PMU 280 does in fact correspond to the class of instruction which is being monitored.

As an example, consider the case of a load instruction in a loop which causes many more data cache misses than other loads. Each time this load is executed, and causes a cache miss, the counter is incremented. If the counter is within some epsilon (e.g., 15) of wrapping, then a trap is registered and a corresponding signal conveyed. Software may then correctly identify this load as the instruction which was executing when a cache miss occurred, even though the counter has not yet wrapped. This may be considered equivalent to sampling the cache miss on a different iteration of the loop than would be the case if the counter actually wrapped. However, this does not affect the conclusion that this load instruction may be responsible for most cache misses.

Similarly, consider a case where there are two load instructions which cause most of the misses. In this case, given a large enough number of samples, the trap will be taken on one of these 2 load instructions. Again a trap may be taken as described above and diagnostic software may be utilized to isolate the important program statements. Even if it turns out that only one of the load instructions is always recorded as executing when the trap is taken, software may correctly identify this load and its associated program statement. Once corrected, software can rerun and the remaining load will be seen as causing the most cache misses.

It should be noted that a trap will not generally be indicated except on a class of instructions which actually experience the event. For example, if a trap was signaled on a load instruction which did not have a cache miss, then it would be more difficult for diagnostic software to isolate the load(s) which actually cause the majority of the cache misses. In such a case, the sample may falsely point to an unrelated event and effectively inject noise into the analysis.

Finally, it should be noted that is generally desirable that hardware generate precise traps in order for software to be effectively utilized. A trap is precise if, when control is transferred to the software trap handler, all instructions prior to the one causing the trap have completely executed, and neither the instruction causing the trap nor any subsequent instructions have been executed. In a pipelined embodiment, then, it becomes necessary to suppress the effect of an instruction which traps as well as instructions from the same thread which are at earlier stages in the pipeline. In the absence of a method and mechanism such as that described above, meeting these desired goals may be quite difficult.

For example, consider a case where software has configured a PIC to count load instructions and there are multiple instructions from the same thread in the pipeline. In particular consider a case where there may be a load instruction in each or any pipeline stage of FIG. 6, all from the same thread. Ideally hardware should be able to identify the exact load which will cause the counter to wrap. However, this may generally require mass-balance logic in conjunction with multiple comparators. For example, assume the PIC has a value of $-1$. Then the first (oldest) load in the pipeline will cause the counter to wrap. Referring to the pipeline stages in FIG. 6, in one embodiment the load in Bypass (being the oldest load in the pipeline) will cause the counter to wrap. But, if there is no load in Bypass, and there is a load in Memory, then that load will cause the counter to wrap. Similarly, if there is no load in Bypass or Memory, the load in Execute will cause the counter to wrap. Similarly this can be carried all the way to Decode where an instruction type (load, store, branch, etc.) is discovered and becomes known.

Now consider the case where the PIC has a value of $-2$. In this case the $2^{nd}$ load in the pipeline will cause the counter to wrap. So it is clear to one of ordinary skill in the art that the logic for pinpointing which load will cause a trap needs to be qualified based upon the current value of the PIC for that thread, and how many loads from that thread precede this load in the pipeline. The logic to accomplish this may quickly become untenable as the number of threads, the number of pipeline stages, and the number of different events grows. Yet in the exemplary embodiment described above, comparator 850 in conjunction with AND gate 845 enables hardware to identify an instruction as a precise "candidate" which may cause a PIC to overflow. In turn this enables the TLU 270 to identify both the thread ID and the pipeline stage such that all later instructions from that thread should be suppressed. In turn this enables the hardware to transfer control via a precise trap to a software trap handler.

Thus the above mechanism may, in a sense, be seen as a "fuzzy" trap implementation. This approach may generally simplify hardware design and still allow software to effectively debug performance issues. In large part, the following may be met by the above described approach: First, hardware indicates a trap upon overflow within an appropriate precision of when the trap would actually occur and the precision (epsilon) is small enough such that it may be deemed relatively insignificant given a sufficiently large sampling interval. In addition, the trap is generally indicated only for a class of instructions which actually experienced or caused the performance event, and not on unrelated instructions. Second, hardware maintains an accurate count of performance events. Hardware counts only the events it is actually configured to count, suppresses speculative events whenever possible, and accurately counts events which did in fact occur. Third, in a pipelined embodiment, it enables hardware to take a precise trap on a candidate instruction which caused the performance event.

Exemplary System Embodiment

Figure 9:
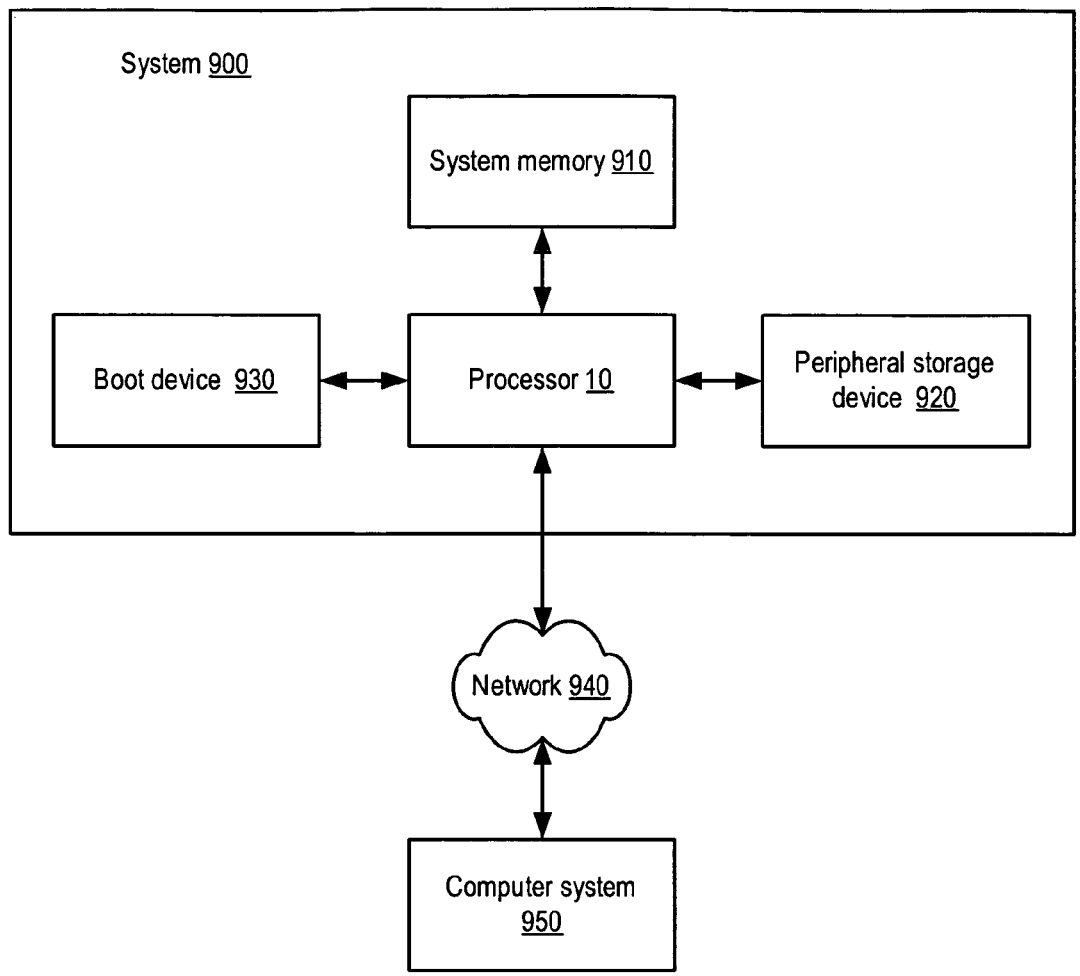
FIG. 9 illustrates on embodiment of a computing system.

As described above, in some embodiments processor 10 of FIG. 1 may be configured to interface with a number of external devices. One embodiment of a system including processor 10 is illustrated in FIG. 9. In the illustrated embodiment, system 900 includes an instance of processor 10 coupled to a system memory 910, a peripheral storage device 920 and a boot device 930. System 900 is coupled to a network 940, which is in turn coupled to another computer system 950. In some embodiments, system 900 may include more than one instance of the devices shown, such as more than one processor 10, for example. In various embodiments, system 900 may be configured as a rack-mountable server system, a standalone system, or in any other suitable form factor. In some embodiments, system 900 may be configured as a client system rather than a server system.

In various embodiments, system memory 910 may comprise any suitable type of system memory as described above, such as FB-DIMM, DDR/DDR2 SDRAM, or RDRAM®, for example. System memory 910 may include multiple discrete banks of memory controlled by discrete memory interfaces in embodiments of processor 10 configured to provide multiple memory interfaces 130. Also, in some embodiments system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, an IEEE 1394 interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc.

What is claimed is:

1. A performance monitoring mechanism comprising: a count register configured to store a count corresponding to a detected event; a configuration register configured to store an indication as to what events are monitored; and circuitry configured to: update the count register from a first count to a first new count, the count register being configured to count events of a first type; detect an occurrence of an event of the first type; update the count register from the first new count to a second new count, in response to detecting the occurrence of the event; convey a trap indication responsive to detecting (i) the occurrence of the event, and (ii) determining the first new count is equal to or exceeds a predetermined value; and convey a trap indication responsive to detecting (i) the occurrence of the event, and (ii) determining the first new count is within a predetermined range of the predetermined value, and is less than the predetermined value, wherein the trap indication indicates that a number of events of the first type that have occurred is equal to or exceeds the predetermined value while the number of events of the first type that have occurred is less than the predetermined value.

2. The mechanism as recited in claim 1, wherein the predetermined value equals zero, and wherein the circuitry is further configured to initialize the count register to a first negative value, the first negative value having a magnitude equal to a number of events to be counted prior to conveyance of a corresponding trap indication.

3. The mechanism as recited in claim 2, wherein in response to receiving a non-performance monitoring trap indication, the circuitry is configured to suppress updating of the count stored in the count register.

4. The mechanism as recited in claim 3, further comprising a plurality of count registers, each of the plurality of count registers corresponding to a different thread of a plurality of threads of instructions in a multithreaded processing system.

5. The mechanism as recited in claim 4, further comprising circuitry configured to repeatedly cycle through each of the plurality of count registers, wherein event counts corresponding to only a single thread are updated at one time.

6. A multithreaded multicore microprocessor comprising: an interconnect; and a plurality of processing cores coupled to said interconnect; wherein a first core of said cores includes: a plurality of execution units; a trap logic unit; and a performance monitor unit coupled to one or more of the execution units and the trap logic unit, wherein the performance monitor unit is configured to: update a count register from a first count to a first new count, the count register being configured to count events of a first type; detect an occurrence of an event of the first type; update the count register from the first new count to a second new count, in response to detecting the occurrence of the event; convey a trap indication responsive to detecting (i) the occurrence of the event, and (ii) determining the first new count is equal to or exceeds a predetermined value; and convey a trap indication responsive to detecting (i) the occurrence of the event, and (ii) determining the first new count is within a predetermined range of the predetermined value, and is less than the predetermined value, wherein the trap indication indicates that a number of events of the first type that have occurred is equal to or exceeds the predetermined value while the number of events of the first type that have occurred is less than the predetermined value.

7. The microprocessor as recited in claim 6, wherein the performance monitor unit further comprises a configuration register corresponding to the event counter, wherein the configuration register is configured to store an indication as to what events are monitored.

8. The microprocessor as recited in claim 7, wherein the predetermined value equals zero, and wherein the performance monitor unit is further configured to initialize the event counter to a first negative value with a magnitude equal to a number of events to be counted prior to conveyance of a corresponding trap indication.

9. The microprocessor as recited in claim 8, wherein in response to receiving a non-performance monitoring trap indication, the performance monitor unit is configured to suppress updating of the count stored in the count register.

10. The microprocessor as recited in claim 9, further comprising a plurality of count registers, each of the plurality of count registers corresponding to a different thread of a plurality of threads of instructions in a multithreaded processing system.

11. The microprocessor as recited in claim 10, wherein the performance monitor unit further comprises circuitry configured to repeatedly cycle through each of the count registers in turn over a first period of time, wherein event counts corresponding to only a single thread are updated at one time.

12. A computing system comprising: a multithreaded multicore microprocessor; a peripheral storage device; and a system memory; wherein the microprocessor is configured to: update a count register from a first count to a first new count, the count register being configured to count events of a first type; detect an occurrence of an event of the first type; update the count register from the first new count to a second new count, in response to detecting the occurrence of the event; convey a trap indication responsive to detecting (i) the occurrence of the event, and (ii) determining the first new count is equal to or exceeds a predetermined value; and convey a trap indication responsive to detecting (i) the occurrence of the event, and (ii) determining the first new count is within a predetermined range of the predetermined value, and is less than the predetermined value, wherein the trap indication indicates that a number of events of the first type that have occurred is equal to or exceeds the predetermined value while the number of events of the first type that have occurred is less than the predetermined value.

13. The system as recited in claim 12, wherein the microprocessor comprises a configuration register corresponding to the event counter, the configuration register being configured to store an indication as to what events are monitored.

14. The system as recited in claim 13, wherein in response to receiving a non-performance monitoring trap indication, the microprocessor is configured to suppress updating of the event counter.

15. The system as recited in claim 14, wherein the microprocessor further comprises:
a plurality of count registers, each of the plurality of count registers corresponding to a different thread of a plurality of threads of instructions in a multithreaded processing system; and
circuitry configured to repeatedly cycle through each of the plurality of count registers in turn over a first period of time, wherein event counts corresponding to only a single thread are updated at one time.

16. A method of performance monitoring comprising: updating a count register from a first count to a first new count, the count register being configured to count events of a first type; detecting an occurrence of an event of the first type; updating the count register from the first new count to a second new count, in response to detecting the occurrence of the event; conveying a trap indication responsive to detecting (i) the occurrence of the event, and (ii) determining the first new count is equal to or exceeds a predetermined value; and conveying a trap indication responsive to detecting (i) the occurrence of the event, and (ii) determining the first new count is within a predetermined range of the predetermined value, and is less than the predetermined value, wherein the trap indication indicates that a number of events of the first type that have occurred is equal to or exceeds the predetermined value while the number of events of the first type that have occurred is less than the predetermined value.

17. The method as recited in claim 16, further comprising storing in a configuration register which corresponds to the event counter an indication as to what events are to be monitored.

18. The method as recited in claim 17, further comprising suppressing updating of the event counter in response to receiving a non-performance monitoring trap indication.

19. The method as recited in claim 18, wherein events corresponding to each of a plurality of threads may be monitored, each of the threads having a corresponding counter, wherein the method further comprises repeatedly cycling through and updating the event count register for each of the threads in turn over a first period of time.

* * * * *